Figure 2:
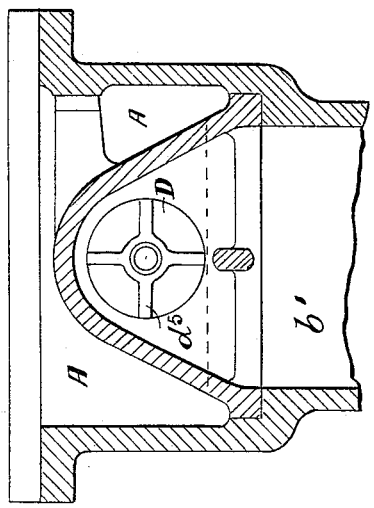

(No Model.) 2 Sheets—Sheet 1.

J. W. MELLING.
STEAM VALVE.

No. 405,787. Patented June 25, 1889.

Witnesses:
E. R. Brown
E. L. Richards

Inventor.
John William Melling,
By Richards & Co.
Attorneys.

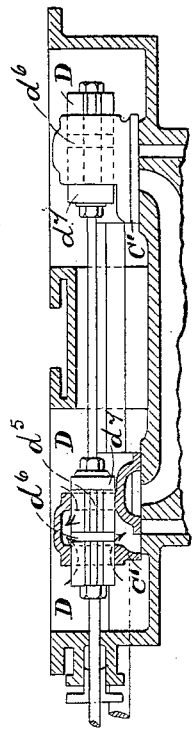
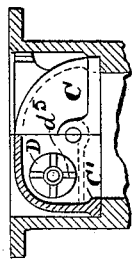
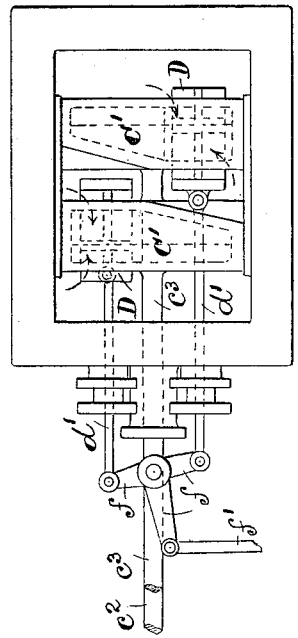
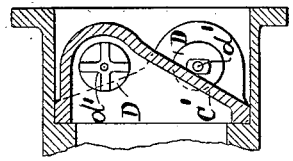
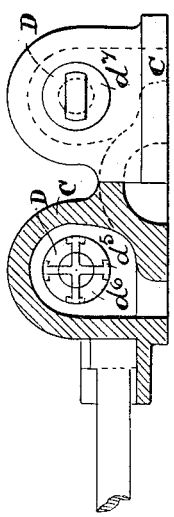
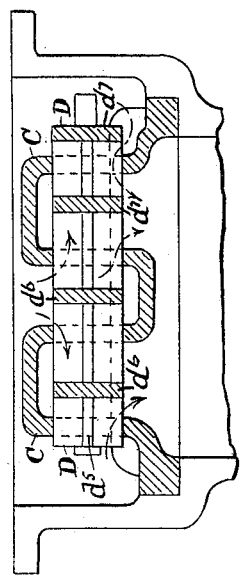

UNITED STATES PATENT OFFICE.

JOHN WILLIAM MELLING, OF WIGAN, COUNTY OF LANCASTER, ENGLAND.

STEAM-VALVE.

SPECIFICATION forming part of Letters Patent No. 405,787, dated June 25, 1889.

Application filed September 28, 1888. Serial No. 286,643. (No model.) Patented in England September 29, 1887, No. 13,178.

*To all whom it may concern:*

Be it known that I, JOHN WILLIAM MELLING, a subject of the Queen of Great Britain, residing at Wigan, in the county of Lancaster, England, have invented certain new and useful Improvements in Valves for Steam and other Motive-Power Engines, (for which I have obtained a patent in Great Britain, No. 13,178, dated September 29, 1887,) of which the following is a specification.

My invention relates to improvements in valves for engines worked by steam or other elastic fluid under pressure; and my improvements consist in the construction and arrangement of a cut-off or expansion valve or valves composed of two or more disks connected together by a feather or web of metal, the disks being fitted and free to slide in rings or seatings formed in or attached to the frame and sides of the slide or main valve. In some cases where I use two or more pairs of disks I connect each pair together and mount them all adjustably on one spindle or valve-rod. In the chief arrangement a slide-valve and three disks with connecting pieces are used, the disks being fitted into rings or seatings formed in or attached to the frame and sides of the steam-passages. The center disk serves for both ends of the main valve, alternately cutting off the steam by one of its sides for one end of the cylinder and by its other side for the other end of the cylinder. The disks are coupled the same distance apart as the sides of or openings into the steam-ports, so that the flow of steam is stopped at the same time by both disks. In all positions the coupled disks are in a state of equilibrium, and thus are easily operated. This arrangement is applicable where a varying length of travel is given to the disk or expansion valves, the travel being regulated from the governor or by hand. Where it is preferred to actuate the expansion-valves by a uniform traverse, I may employ two separate expansion-valves, each formed of two or more disks connected to separate spindles jointed to the opposite ends of a double lever, which is pivoted at its center to a rod which receives movement from the eccentric or otherwise. The center of the double-ended lever is also connected by rods to the governor, by which the position of the valve is altered so as to vary the degree of expansion; or the position of the valves may be adjusted by hand. The valves may consist of any number of disks arranged in pairs and coupled as before mentioned, excepting where one disk can do double duty.

And in order that my invention may be fully understood and readily carried into effect, I will describe the accompanying two sheets of drawings, reference being had to the figures and letters marked thereon.

Figure 1:
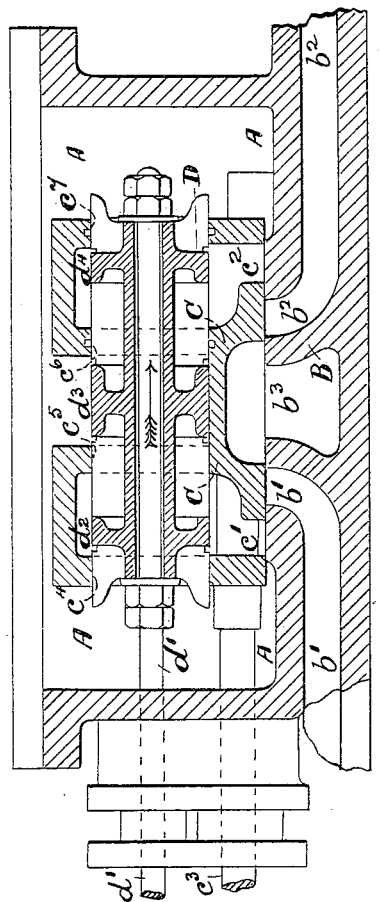
Figure 3:
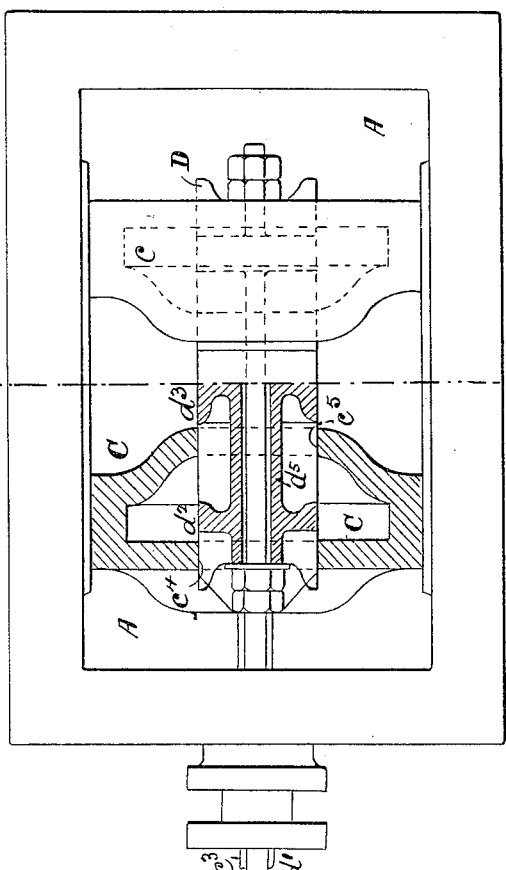

Figure 1 is a longitudinal sectional elevation, Fig. 2 a transverse vertical section, and Fig. 3 a plan, partly in section, of one form of slide-valve fitted and combined with my improved expansion-valve; and Figs. 4 to 9 are views of slight modifications in the arrangement and mode of combining my improved expansion-valve with different forms of slide-valves.

Similar letters refer to similar parts throughout the several views.

In Figs. 1 to 3, A designates the steam or valve chest; B, part of the cylinder; $b'\ b^2$, the steam-admission and $b^3$ the exhaust ports; C, the main slide-valve, which has the ordinary ports $c'\ c^2$ through it, and is operated by the rod $c^3$ from an eccentric, (not shown,) and D the improved expansion-valve operated by the rod $d'$, connected to a rocking link or other well-known arrangement of mechanism by which a varying traverse can be given to it automatically from the governor or by hand. The valve D consists of three disks $d^2\ d^3\ d^4$, shown connected together in this case by the four connecting metal pieces or feathers $d^5$, the edges of which are turned of the same size as the disks, so that all can work smoothly and freely in the rings $c^4\ c^5\ c^6\ c^7$, formed by the bored sides of the ports $c'\ c^2$ in the main valve C. When in the position shown in Figs. 1 and 3, the expansion-valve D is in the middle of its traverse, and the central disk $d^3$ is made to do double duty, as one side cuts off the steam from the port $c'$ and the other side from the port $c^2$.

Let it be supposed, for the sake of illustration, that the further movement of the main valve C be in the direction of the arrow, Fig. 1, so as to open the port $b'$ of the cylinder. Then steam would enter past the disk $d^2$, and also past one side of the disk $d^3$ into the port $b'$, until the movement of the expansion-valve D brought the disks $d^2$ $d^3$ into the rings $c^4$ $c^5$, and so cut off steam from the port $b'$. The admission of steam to the other end of the main valve is controlled in a similar manner by the other side of the disk $d^3$ and the disk $d^4$, which arrest the flow of steam when they are brought into the rings $c^6$ $c^7$.

It will be observed that as the disks have equal areas exposed to the pressure of steam they are in equilibrium at all points of their traverse.

Fig. 4 is an elevation and Fig. 5 an end view, both partly in section, of a pair of single slide-valves $C'$ $C'$ fitted with my improved expansion-valves D D. In this case each expansion-valve D consists of a pair of disks $d^6$ $d^7$ connected together by the feathers $d^5$, and the expansion-valves are shown (Fig. 5) placed out of center with the main valve, which in some cases would be preferable.

Fig. 6 is a plan and Fig. 7 a sectional end view of another arrangement according to my invention, in which two of my improved expansion-valves D, each consisting of a pair of disks, are fitted upon a double slide-valve $C'$, which receives a constant uniform traverse by means of the rod $C^2$, operated by an eccentric. (Not shown). The expansion-valves D are traversed by the rod $c^3$, which is connected by a double elbow-lever $f$, pivoted thereon to the valve-rods $d'$. The double elbow-lever $f$ is also connected by a rod $f'$ to the governor, whereby the variation in the time of the cut-off is effected, according to the changes in the position of the lever $f$, which cause the valves D to cut off earlier or later, as required.

Fig. 8 is a side view and Fig. 9 an end view, both partly in section, illustrating another mode of applying a pair of my improved expansion-valves D to a slide-valve C. In this case the valves D are traversed at right angles to or across the path of the main valve, and are thus independent of its movement. The expansion-valves D are shown as consisting of four disks in two pairs $d^6$ $d^7$, and thus provide four openings into the main-valve ports, all of which are opened and closed simultaneously.

In place of applying my improved expansion-valves to slide-valves, as herein shown and described, they may be applied to any other form of valve to which they are adapted.

What I claim as my invention, and desire to secure by Letters Patent of the United States, is—

1. The combination, with a main slide-valve, of a compound expansion-valve made up of disks of equal areas mounted in pairs connected together and arranged to slide in rings or seatings, said main valve having a steam-admission opening to the expansion-valve on each side of each cut-off disk, all substantially as herein set forth, for the purposes specified.

2. The combination, with a main slide-valve, of an expansion-valve D, consisting of three disks of equal areas connected together and fitted and working in rings formed by the bored sides of the ports in the main valve, the latter having a steam-admission opening to the expansion-valve at each end, and an intermediate opening controlled by the middle disk, all arranged and operating substantially as herein described.

3. The combination, with a pair of single slide-valves, of a pair of expansion-valves D, consisting of a pair of disks and an intermediate disk fitted in rings and connected together by the feathers $d^5$, all arranged and operating substantially as herein described and shown.

In witness whereof I have hereunto set my hand in presence of two witnesses.

JOHN WILLIAM MELLING.

Witnesses:
  HAYES THOMPSON,
    23 *Kenyon Rd., Wigan.*
  LUCY A. FRANCE,
    5 *Park View, Wigan.*